United States Patent [19]
Luethi

[11] 3,907,904
[45] Sept. 23, 1975

[54] OPTICAL BRIGHTENERS COMPRISING ALKOXY DERIVATIVES OF DISTYRYLDIPHENYL

[75] Inventor: Christian Luethi, Muenchenstein, Switzerland

[73] Assignee: Ciba-Geigy AG, Basel, Switzerland

[22] Filed: Aug. 30, 1972

[21] Appl. No.: 284,800

[30] Foreign Application Priority Data
Sept. 1, 1971 Switzerland.................... 12827/71

[52] U.S. Cl....................... 260/613 R; 8/73; 8/76; 117/33.5 R; 117/33.5 T; 162/162; 252/301.2 W; 260/37 R; 260/37 P; 260/42.43; 260/340.5; 260/566 F; 260/600; 260/606.5 P; 260/612 R; 260/613 D; 260/961; 260/962; 260/967
[51] Int. Cl.²................... C07C 43/20; C07C 43/26
[58] Field of Search......... 260/612 R, 613 A, 340.5, 260/613 R

[56] References Cited
OTHER PUBLICATIONS

Siegrist et al., I, "Chem. Ab.," Vol. 71, p. 71927j, (1969), [excerpt from S. African Pat. No. 68/04,421, (11-21-68)].
Weber et al., "Chem. Ab.," Vol. 73, p. 16306x, (1970), [excerpt from S. African Pat. No. 68/06,288, (3-6-69)].
Siegrist et al. II, "Chem. Ab.," Vol. 72, p. 21409s, (1970), [excerpt from "Helv. Chm. Acta.," (1969), Vol. 52(8), pp. 2521-2554].

*Primary Examiner*—Norman P. Morgenstern
*Attorney, Agent, or Firm*—Joseph G. Kolodny; Prabodh I. Almaula; Edward McC. Roberts

[57] ABSTRACT

The invention relates to selected alkoxy derivatives of distyryldiphenyl, having at least one alkoxy group in one of the ortho-positions or in the meta-positions of the styryl moieties. The new compounds are useful as optical brighteners.

9 Claims, No Drawings

OPTICAL BRIGHTENERS COMPRISING ALKOXY DERIVATIVES OF DISTYRYLDIPHENYL

The present invention relates to selected alkoxy derivatives of distyryldiphenyl, a process for their manufacture, and to their use as optical brighteners for organic materials.

Alkoxy derivatives of distyryldiphenyl are already known, but these are exclusively compounds in which at least one of the alkoxy groups is in para-position to the stilbene double bond. However, it has been discovered that this particular position for alkoxy groups is not very advantageous with regard to optical brightening effects and that rather substitution in the meta- and ortho-position leads to selection products.

Accordingly, the principal characteristic of the distyryldiphenyl derivatives according to the invention is that they contain at least one alkoxy group in one ortho-position or in one of the two meta-positions, with the term "alkoxy group" also being understood as meaning a methylenedioxy group. These new compounds accordingly correspond to the general formula (1) 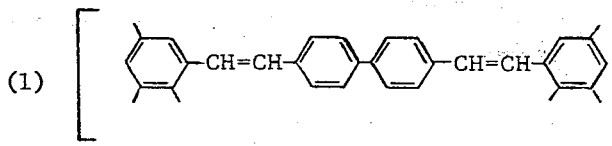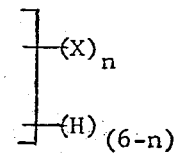

wherein $n$ represents an integer from 1 to 6 and the symbols X and H occupy the valencies of the general formula. The symbol X represents herein alkoxy containing from 1 to 4 carbon atoms, alkyl, alkenyl containing from 3 to 4 carbon atoms, and is to be understood as meaning that several symbols X together may be the same or different and two symbols X in the adjacent position may also represent a methylenedioxy group, the condition being, however, that X represents at least once an alkoxy group containing from 1 to 4 carbon atoms or two adjacent symbols represent a methylenedioxy group.

Within the scope of the above definition practical interest attaches primarily to those compounds which correspond to the formula (2) 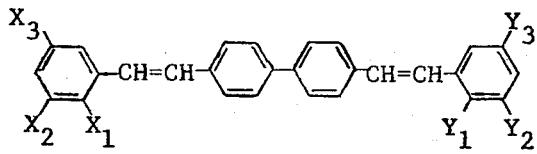

wherein $X_1$, $X_2$ and $X_3$ are the same or different and represent hydrogen, alkyl containing from 1 to 12 carbon atoms or alkoxy containing from 1 to 4 carbon atoms, also one of the symbols $X_1$, $X_2$ and $X_3$ may represents an alkenyl group containing from 3 to 4 carbon atoms or $X_1$ together with $X_2$ may represent a methylenedioxy group, in which connection, however, at least one of the symbols $X_1$, $X_2$ and $X_3$ represents an alkoxy group containing from 1 to 4 carbon atoms or $X_1$ together with $X_2$ represents a methylenedioxy group, $Y_1$, $Y_2$ and $Y_3$ are the same or different and represent hydrogen, alkyl containing from 1 to 12 carbon atoms or alkoxy containing from 1 to 4 carbon atoms, one of the symbols $Y_1$, $Y_2$ or $Y_3$ represents an alkenyl group containing from 3 to 4 carbon atoms, or $Y_1$ together with $Y_2$ may represent a methylenedioxy group.

The essential condition for the present invention, namely that at least one alkoxy group must be present within the scope of the symbols $X_1$, $X_2$ and $X_3$ is to be generally understood as meaning that this condition is fulfilled by the presence of a methylenedioxy group.

The characteristic features — either alone or in combination — of the preferred compounds according to the invention are that these compounds, where alkyl groups are present, contain such groups which have from 1 to 4 carbon atoms, two to four alkoxy groups which have from 1 to 4 carbon atoms, and mostly have a symmetrical structure (with respect to the central diphenylyl unit).

Accordingly, these types of compound correspond to the following formulae:

a. compounds of the formula (3) 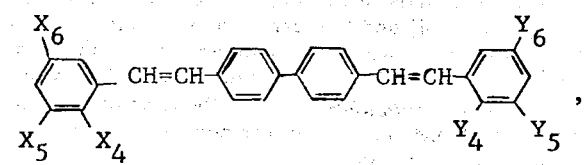

wherein $X_4$, $X_5$ and $X_6$ are the same or different and represent hydrogen, alkyl containing from 1 to 4 carbon atoms or alkoxy containing from 1 to 4 carbon atoms, $X_5$ may also represent an alkenyl group containing from 3 to 4 carbon atoms and furthermore $X_4$ together with $X_5$ may represent a methylenedioxy group, in which connection, however, at least one and up to two of the symbols $X_4$, $X_5$ and $X_6$ represent an alkoxy group containing from 1 to 4 carbon atoms, or $X_4$ together with $X_5$ represent a methylenedioxy group, $Y_4$, $Y_5$ and $Y_6$ are the same or different and represent hydrogen, alkyl containing from 1 to 4 carbon atoms or alkoxy containing from 1 to 4 carbon atoms, $Y_5$ may also represent an alkenyl group containing from 3 to 4 carbon atoms, it being possible for up to two of the symbols $Y_4$, $Y_5$ and $Y_6$ to represent an alkoxy group containing from 1 to 4 carbon atoms, and $Y_4$ together with $Y_5$ may from a methylenedioxy group.

b. Compounds of the formula (4)

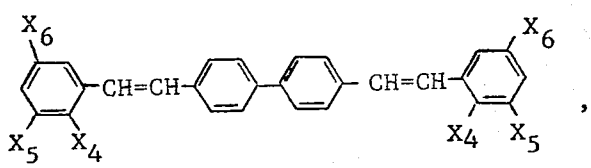

(7b) 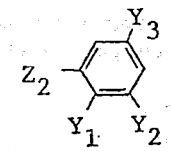

wherein in these formula $X_1$, $X_2$, $X_3$, $Y_1$, $Y_2$ and $Y_3$ have the meanings given hereinbefore and one of the symbols $Z_1$ and $Z_2$ represents a —CHO group and the other represents one of the groupings $$\text{I} \quad -CH_2-\overset{O}{\underset{O-R}{\overset{\|}{P}}}-O-R, \qquad \text{II} \quad -CH_2-\overset{O}{\underset{R}{\overset{\|}{P}}}-O-R,$$

$$\text{III} \quad -CH_2-\overset{O}{\underset{R}{\overset{\|}{P}}}-R \qquad \text{and} \qquad \text{IV} \quad -CH=\overset{R}{\underset{R}{\overset{|}{P}}}-R$$

wherein R represents an optionally further substituted alkyl, aryl, cycloalkyl or aralkyl radical.

wherein $X_4$, $X_5$ and $X_6$ are the same or different and represent hydrogen, alkyl containing from 1 to 4 carbon atoms or alkoxy containing from 1 to 4 carbon atoms, also one of the symbols $X_5$ or $X_6$ represents an allyl or crotyl group or $X_4$ together with $X_5$ represent a methylenedioxy group, in which connection, however, at least one and up to two of the symbols $X_4$, $X_5$ and $X_6$ represent an alkoxy group containing from 1 to 4 carbon atoms or $X_4$ together with $X_5$ represent a methylenedioxy group. c. Compounds of the formula The procedure according to this method is preferably such that about 1 molar equivalent of a compound of the formula (6a) 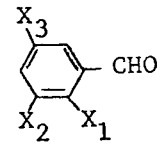

is reacted with about 1 molar equivalent of a compound of the formula (5)

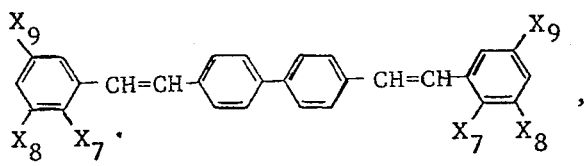

wherein one of the symbols $X_7$, $X_8$ and $X_9$ represents a methoxy group, a second represents hydrogen or methoxy and the third represents hydrogen or an alkyl group containing from 1 to 4 carbon atoms.

The compounds according to the above formulae (1), (2), (3), (4) and (5), can be manufactured analogously to known processes. A suitable process results, for example, from the phosphonate method. For example, to manufacture compounds of the formula (2), the procedure is that about 1 molar equivalent of a compound of the formula (7c) 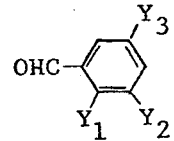

and about 1 molar equivalent of a compound of the formula (7d) 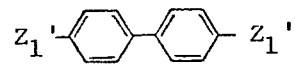

(6) 

is reacted with about 1 molar equivalent of a compound of the formula wherein $X_1$, $X_2$, $X_3$, $Y_1$, $Y_2$ and $Y_3$ have the meanings given hereinbefore and $Z_1'$ represents one of the groupings of the formulae (7a) 

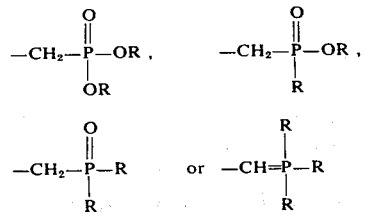

with the above given meaning of R.

and about 1 molar equivalent of a compound of the formula

The phosphorus compounds of the formulae (7a) and (7b) which are here required as starting materials are obtained in known manner by reacting halogenomethyl compounds, preferably chloromethyl or bromomethyl compounds of the formulae

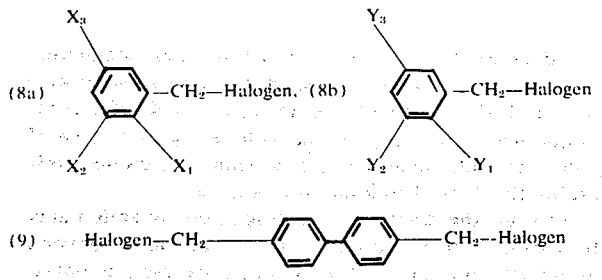

with phosphorus compounds of the formulae

(10)    R—O—P—O—R
             |
             O—R

(11)    R—O—P—O—R
             |
             R

(12)    R—P—R
           |
           R

(13)    R—P—OR
           |
           R

In these formulae R has the indicated meaning, with radicals R bonded to oxygen being preferably lower alkyl groups, whereas radicals R bonded to phosphorus are preferably aryl radicals, such as benzene radicals.

Of the process variants cited hereinbefore, a suitable one for the manufacture of compounds according to formula (2) is that according to which about 1 molar equivalent of a compound of the formula

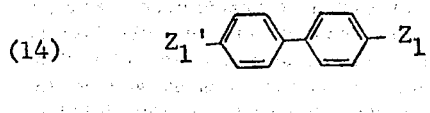

is reacted with about 1 molar equivalent of a compound of the formula (7c) and (7d), wherein $Z_1'$ represents a grouping of the formulae (I), (II), (III) and (IV).

A variant of particular practical interest consists in using as diphenyl components according to formulae (6a) those which correspond to the formula

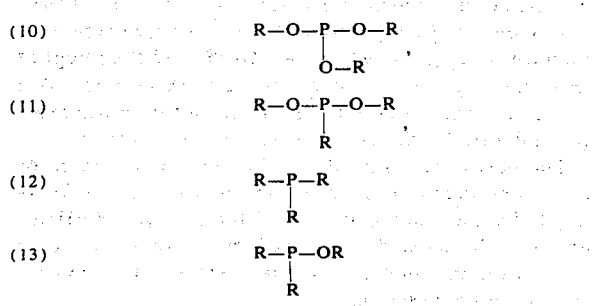

wherein R' represents an alkyl group containing from 1 to 6 carbon atoms.

The manufacturing process is advantageously carried out in inert solvents. As examples thereof, there may be mentioned hydrocarbons such as toluene and xylene or alcohols such as methanol, ethanol, isopropanol, butanol, glycols, glycol ethers such as 2-methoxyethanol, hexanols, cyclohexanol and cyclooctanol, and also ethers such as diisopropyl ether, tetrahydrofurane and dioxane, as well as dimethyl sulphoxide, formamide and N-methylpyrrolidone. Polar organic solvents such as dimethyl formamide and dimethyl sulphoxide are particularly suitable. Some of the reactions can also be carried out in aqueous solution.

The temperature at which the reaction is carried out can vary within wide limits. It is determined ($\alpha$) by the interness of the solvent used towards the reactants, especially towards the strongly basic alkali compounds, ($\beta$) by the reactivity of the condensation partners and ($\gamma$) by the activity of the combination of solvent and base as a condensation agent.

In practice, accordingly, temperatures between about 10° and 100°C are in general used, especially if dimethyl formamide or dimethyl sulphoxide are employed as solvents. The preferred temperature range is 20° to 60°C. However, under certain circumstances higher temperatures can also be employed if this is desired for reasons of time saving or if a less active but cheaper condensation agent is to be employed. In principle, reaction temperatures in the range of 10° to 180°C are thus also possible.

Strongly basic alkali compounds which can be used are above all the hydroxides, amides and alcoholates (preferably those of primary alcohols containing 1 to 4 carbon atoms) of the alkali metals, amongst which those of lithium, sodium and potassium are, for economic reasons, of predominant interest. In particle, and in special cases, it is however also possible to employ successfully alkali sulphides and alkali carbonates, arylalkali compounds, such as, for example, phenyllithium, or strongly basic amines (including ammonium bases, for example trialkylammonium hydroxides).

When using the processes described above for the manufacture of asymmetrical derivatives (which are of secondary importance), the competing reaction of the three reactants in the first place yields mixtures of asymmetrically substituted bis-stilbene compounds according to the formula (I) and the two corresponding synnetrically substituted bisstilbene. The separation of these components, if desired, is effected by fractional recrystallisation, and/or column chromatography.

The aldehydes which are circumscribed, for example, by the formulae (17) and (18), are for the most part known, and the manufacture of a large number is described in the literature [see, for example, Ann. 401, page 91 to 119 (1913); J.Pr. CH. 77, page 364 to 366 (1908); 38, page 1676 (1905); DRP 209,608; Ann. 357, page 313 to 383 (1907); J. Med. Chem. 12, page 420 to 424 (1969)]. They are obtained almost without exception by etherification of the corresponding hydroxybenzaldehydes. Hitherto unknown aldehydes are also obtainable by analogous processes. The section dealing with examples deals especially with the manufacture of some aldehydes.

Within the scope of the present invention, preferred practical significance attaches to the reaction according to the formulae (I), (7c) and (7d) — of aldehydes of the formulae

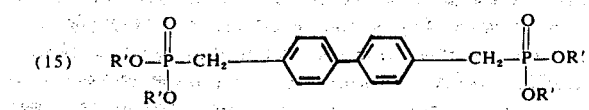

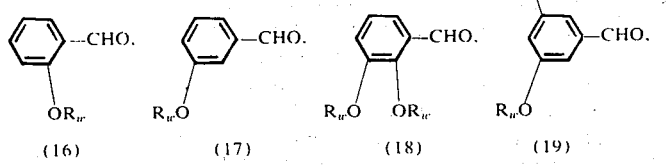

(16)   (17)   (18)   (19)

wherein $R_{1r}$ represents an alkyl group containing from 1 to 4 carbon atoms, with 4,4'-di-(alkoxyphosphonomethyl)-diphenyl.

On the other hand, it is possible to use the so-called anil synthesis for the synthesis of a series of compounds within the formula (1).

For example, it is possible to manufacture compounds according to formula (4) by reacting 4,4'-dimethyl-biphenyl with approximately double the molar amount of an anil of the formula

(20) 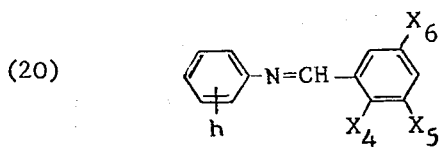

wherein in the formula $h$ represents hydrogen or chlorine and $X_4$, $X_5$ and $X_6$ have the meanings given hereinbefore, but $X_4$ may not represent the methyl group, and the reation is carried out in the presence of a strongly basic alkali compound, dimethyl formamide is used as reaction medium and, if alkali hydroxides are used as strongly basic alkali compounds, these alkali hydroxides may contain up to 25% of water.

A strongly basic alkali compound is necessary for this reaction, by which are meant those compounds of alkali metals (1st principal group of the Periodic System of Elements), including ammonium, and which have a base strength of at least about that of lithium hydroxide. Accordingly, these may be compounds of lithium, sodium, rubidium, cesium or ammonium of the type e.g. of the alcoholates, hydroxides, amides, hydrides, sulphides or strongly basic ion exchangers. Advantageously there are used (principally when mild reaction conditions in respect of the reaction temperature appear to be indicated) potassium compounds of the composition

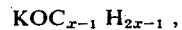

$$KOC_{x-1}H_{2x-1},$$

wherein $x$ represents an integer from 1 to 6, e.g. potassium hydroxide or potassium tert.butylate. In the case of alkali alcoholates, alkali amides (and hydrides) the process is to be carried out in practically anhydrous medium, whereas in the case of alkali hydroxides water contents of up to 25% are permissible (e.g. contents of water of crystallisation). A water content of up to about 15% has proved advantageous in the case of potassium hydroxide. As examples of other useful alkali compounds there may be cited: sodium methylate, sodium hydroxide, sodium amide, lithium amide, lithium hydroxide, rubidium hydroxide or cesium hydroxide. It is, of course, also possible to carry out the process with mixtures of such bases.

The compounds of the type of the formula (4) are appropriately reacted with the aldehyde anils in equivalent amounts so that no substantial excess of any component is present. If several methyl groups are to be reacted, an excess of aldehyde anil may be advantageous. It is advantageous to use at least the equivalent amount of the alkali compound, i.e. at least 1 mole of a compound with, for example, one KOC group to 1 mole of aldehyde anil. When using potassium hydroxide, preferably the 4- to 8-fold amount is used.

As a rule the reaction according to the invention may be carried out at temperatures in the range between about 10° and 150°C. If alcoholates are used as potassium compound, the reaction frequently takes place even at room temperature, in which case no external application of heat is necessary. When using potassium hydroxide, it is mostly necessary to carry out the process at elevated temperature. For example, the reaction mixture is heated slowly to 30°-100°C and then kept at this temperature for some time, e.g. ½ an hour to 2 hours. The final products can processed from the reaction mixture by the conventional known methods.

The new compounds defined above show a more or less pronounced fluorescence in the dissolved or finely divided state. They can be used for the optical brightening of the most diverse synthetic, semi-synthetic or natural organic materials or substances which contain such organic materials.

Synthetic organic high molecular materials, for example polymerisation products based on olefine hydrocarbons, styrenes, polymers based on vinyl and vinylidene compounds (such as, for example, vinyl chloride, vinyl alcohol and vinylidene chloride);

polymerisation products which are obtainable by ring opening, for example, polyamides of the polycaprolactam type, polycondensation products or precondensates based on bifunctional or polyfunctional compounds possessing condensable groups, their homocondensation and co-condensation products, and aftertreatment products, such as, for example, polyester, espeically saturated (for example ethylene glycol terephthalic acid polyester) or unsaturated (for example maleic acid dialcohol polycondensates as well as their cross-linking products with copolymerisable vinyl monomers), unbranched as well as branched (also based on polyhydric alcohols, such as, for example, alkyd resins) polyester, polyamides (for example hexamethylenediamine adipate), also polyaddition products such as polyurethanes (cross-linked and non-cross-linked) and epoxide resins.

The organic materials to be optically brightened can be in the most diverse states of processing (raw materials, semi-finished goods or finished goods). On the other hand, they can be in the form of structures of the most diverse shapes, that is to say, for example, predominantly three-dimensional bodies such as sheets, profiles, injection mouldings, various machined articles, chips, granules or foams, and also as predominantly two-dimensional bodies such as films, foils, lacquers, coverings, impregnations and coatings, or as predominantly one-dimensional bodies such as filaments, fibres, flocks and wires. The said materials can, on the other hand, also be in an unshaped state, in the most diverse homogeneous or inhomogeneous forms of division, such as, for example, in the form of powders, solutions, emulsions, dispersion, latices, pastes or waxes.

Fibre materials can, for example, be in the form of endless filaments (stretched or unstretched), staple fibres, flocks, hanks, textile filaments, yarns, threads, fibre fleeces, felts, waddings, flock structures or woven textile fabrics or textile laminates, knitted fabrics.

The new optical brighteners according to the present invention can further be added to, or incorporated in, the materials before or during their shaping. Thus they can for example be added to the compression moulding composition or injection moulding composition during the manufacture of films, foils (for example milling into hot polyvinyl chloride) or mouldings.

Where fully synthetic or semi-synthetic organic materials are being shaped by spinning processes or via spinning compositions, the optical brighteners can be applied in accordance with the following processes:

Addition to the starting substances (for example monomers) or intermediates (for examples precondensates or prepolymers), that is to say before or during the polymerisation, polycondensation or polyaddition.

Powdering onto polymer chips or granules for spinning compositions.

Bath dyeing of polymer chips or granules for spinning compositions.

Metered addition to spinning melts or spinning solutions, and

Application to the tow before stretching.

The new optical brighteners according to the present invention can, for example, also be employed in the following use forms:

a. Mixed with dyestuffs (shading) or pigments (coloured pigments or especially, for example, white pigments), or as an additive to dye baths, printing pastes, discharge pastes or reserve pastes, or for the aftertreatment of dyeing, prints or discharge prints.

b. Mixed with so-called "carriers", wetting agents, plasticisers, swelling agents, anti-oxidants, light protection agents, heat stabilisers, c. Incorporation of the optical brightener into polymeric carriers (polymerisation, polycondensation or polyaddition products), in a dissolved or dispersed form, for use, for example, in coating compositions, impregnating compositions or binders (solutions, dispersions and emulsions) for textiles, fleeces, paper and leather.

d. As additives to so-called "master batched".

e. As additives to the most diverse industrial products in order to render these more marketable (for example improving the appearance of pigments.

f. In combination with other optically brightening substances.

The amount of the new optical brighteners to be used according to the invention, relative to the materials to be optically brightened, can vary within wide limits. A distinct and durable effect is already achievable with very small amounts, in certain cases, for example, amounts of 0.0001 percent by weight. However, amounts of up to about 0.8 percent by weight and optionally up to about 2 percent by weight can also be employed. For most practical purposes, amounts between 0.0005 and 0.5 percent by weight are of preferred interest.

The following Examples illustrate the invention, the parts and percentages being by weight unless otherwise stated. Melting and boiling points are uncorrected, unless otherwise stated.

Example 1

To a suspension of 6.8 of sodium methylate (content: 95.6%) in 50 ml of anhydrous dimethyl formamide is added dropwise, while stirring thoroughly, a warm (about 60°C) solution of 19.9 g of 4,4'-bis-(dimethoxyphosphonomethyl)-diphenyl of the formula

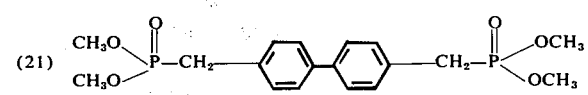

and 13.6 g of 2-methoxybenzaldehyde in 100 ml of anhydrous dimethyl formamide over the course of 4 minutes. In the process, the reaction temperature rises from 22°C to 45°C, with care being taken this temperature is not exceeded by cooling with ice water. The pale yellow suspension is stirred for 2 hours at 40°–45°C, cooled to room temperature, diluted with 150 ml of desalted water and cooled to 15°C. The product which has crystallised out is filtered with suction, washed with desalted water until the washings show neutral reaction and dried under vacuum at 100°C to 110°C, to give 16.5 g (78.9% of theory) of the compound of the formula

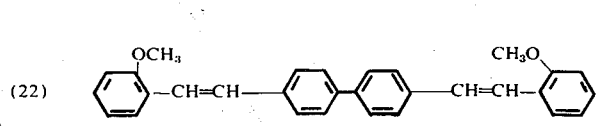

in the form of a pale yellow powder with a melting point of 210°C to 211°C. Recrystallisation thrice from tetrachloroethylene with the addition of fuller's earth gives 8.7 g (41.6% of theory) of a pale yellow crystalline powder with a melting point of 217°–218°C.

To manufacture compound (22) it is also possible to use with equal success the equivalent amount of 4,4'-bis-(diethoxyphosphonomethyl)-diphenyl instead of the 4,4'-bis-(dimethoxyphosphonomethyl)-diphenyl used hereinbefore. Potassium hydroxide (KOH content of about 90%) can be equally well be used as condensation agent instead of sodium methylate. It is also possible to prepare a solution of 4,4'-bis-(dimethoxyphosphonomethyl)-diphenyl and 2-methoxybenzaldehyde in dimethyl formamide and to add the sodium methylate in solid form or in the form of a suspension in dimethyl formamide. Instead of solid sodium methylate it is also possible to use a solution thereof in methanol. Finally, dimethyl sulphoxide may suitable be used as solvent instead of dimethyl formamide.

The distyryldiphenyl compounds of the formula

which are listed in the following Table can be manufactured in similar manner.

Table

| Nr. | R |
|---|---|
| 23 | 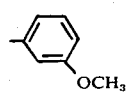 |
| 24 | 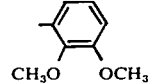 |
| 25 | 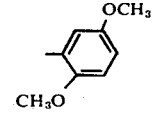 |
| 26 | 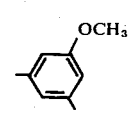 |
| 27 | 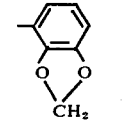 |
| 28 | 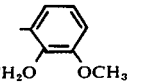 |
| 29 | 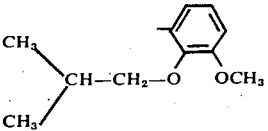 |
| 30 | 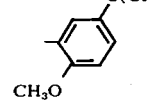 |
| 31 | 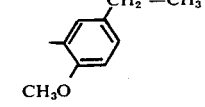 |
| 32 | 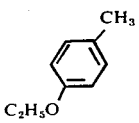 |

Table-Continued

| Nr. | R |
|---|---|
| 33 | 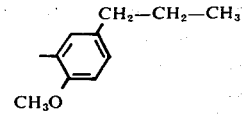 |
| 34 | 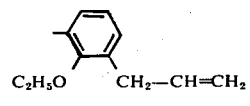 |
| 35 | 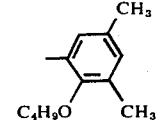 |
| 36 * | 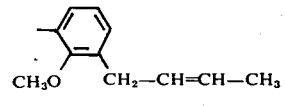 |
| 37 * | 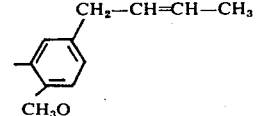 |
| 38 | 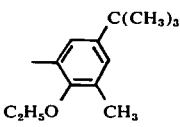 |
| 39 | 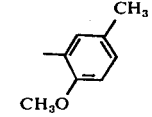 |

Compounds 36 and 37 are obtainable as a mixture in the event of the 2-methoxycrotylbenzaldehyde on which they are based being obtained by Claisen rearrangement of 2-crotyloxybenzaldehyde.

The asymmetrical distyryldiphenyl compounds listed in the following Table may be manufactured in analogous manner e.g. by condensation of 1 molar equivalent of 4,4'-bis-(dimethoxyphosphonomethyl)-diphenyl with 1 mole of each of the respective aldehyde. The isolation of the asymmetrical compound from the mixture with the symmetrical corresponding compounds which originate from a competitive reaction between the reactants of manufacture may optionally be effected, for example, on the basis of the different solubilities.

Very often, however, the mixture of symmetrical and asymmetrical compounds are particularly suitable for the optical brightening of organic materials.

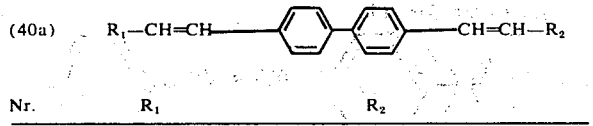

| Nr. | $R_1$ | $R_2$ |
|---|---|---|
| 40 | (phenyl with OCH₃ at para) | (phenyl with OCH₃ at para) |
| 41 | (phenyl with OCH₃ at meta) | (phenyl with CH₃O and OCH₃) |
| 42 | (phenyl with CH₃ and CH₃) | (phenyl with CH₃O) |

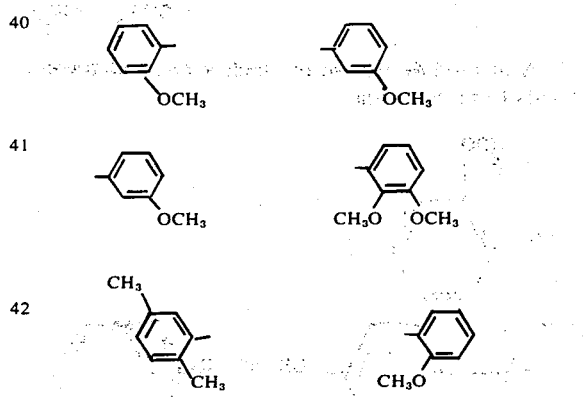

USE—EXAMPLES

No. 2

10,000 g of a polyamide in chip form, manufactured in a known manner from hexamethylenediamine adipate, are mixed with 30 g of titanium dioxide (rutile modification) and 5 g of one of the compounds of the formulae (22), (23), (24), (26) or (34) for 12 hours in a tumbler vessel.

The chips treated in this way are fused in a kettle heated to 300°–310°C by means of oil or diphenyl vapour, after displacing the atmospheric oxygen by steam, and the material is stirred for half an hour. The melt is thereafter extruded through a spinneret under a nitrogen pressure of 5 atmospheres gauge and the filament which has been spun in this way and cooled is wound up on a spinning bobbin. The filaments produced show an excellent brightening effect of good fastness to light and washing.

If instead of a polyamide manufactured from hexamethylenediamine adipate a polyamide manufactured from ε-caprolactam is used, similarly good results are obtained.

No. 3

A polyamide fibre fabric (Perlon) is introduced, using a liquor ratio of 1:40, into a bath at 60°C which contains 0.1% (relative to the weight of fabric) of one of the brighteners of the formulae (22), (24) or (26), and also contains, per litre, 1 g of 80% strength acetic acid and 0.25 g of an addition product of 30 to 35 mols of ethylene oxide to one mol of commercial stearyl alcohol. The mixture is warmed to the boil over the course of 30 minutes and kept at the boil for 30 minutes. After rinsing and drying, a strong brightening effect of good fastness to light is obtained.

If instead of the polyamide-6 fabric a polyamide-6,6(Nylon) fabric is used, similar good brightening effects are obtained.

Finally, the treatment can be carried under HT-conditions, for example for 30 minutes at 130°C. For this type of use, it is advisable to add 3 g/l of hydrosulphite to the liquor.

No. 4

A fabric of polyvinyl chloride fibres ("Thermovyl") is padded at room temperature (about 20°C) with an aqueous dispersion which per litre contains 1 to 2 g of the compound of the formulae (22), (23), (24) or (26), and 1 g of an addition product of about 35 mols of ethylene oxide to 1 mol of octadecyl alcohol, and is dried at about 70°C. The dry material is subsequently subjected to a heat treatment for 3 minutes at 100°C. The fabric of polyvinyl chloride fibres treated in this way has a substantially higher degree of whiteness than an untreated fabric of polyvinyl chloride fibres.

No. 5

An intimate mixture of 100 parts of polyvinyl chloride, 3 parts of stabiliser (Advastat BD 100: Ba/Cd complex), 2 parts of titanium dioxide, 59 parts of dioctyl phthalate and 0.01 to 0.2 part of one of the compounds of the formulae (22), (24) or (25) are milled on a calender at 150° to 155°C to give a sheet. The opaque polyvinyl chloride sheet thus obtained has a substantially higher degree of whiteness than a sheet which does not contain the optical brightener.

No. 6

100 parts of polystyrene and 0.1 part of one of the compounds of the formulae (22), (23) or (24) are used in a tube of 1 cm diameter for 20 minutes at 210°C, with exclusion of air. After cooling, an optically brightened polystyrene composition of good fastness to light is obtained.

No. 7

1.5 g of a delustring agent, 1 g of titanium dioxide (rutile type) and 0.05 g of the compound of the formula (25) are stirred into a polyurethane coating composition of 13.3 g of isocyanate-modified polyester, 26.7 g of ethyl acetate, 2 g of a reaction accelerator and 2 g of polyfunctional isocyanate as a cross-linking agent. This mixture is left to stand for 2 hours and is then spread by means of a knife or a film-spreading rod onto a cotton fabric (wet film thickness 1 mm). Thereafter the coating is dried for 24 hours at room temperature. The fabric coated in this way shows a strong optical brightening effect.

Similar results are obtained on using the compounds of the formulae (22), (23), (24) or (34).

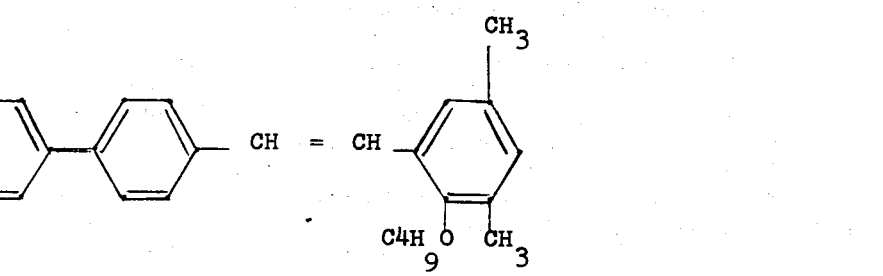

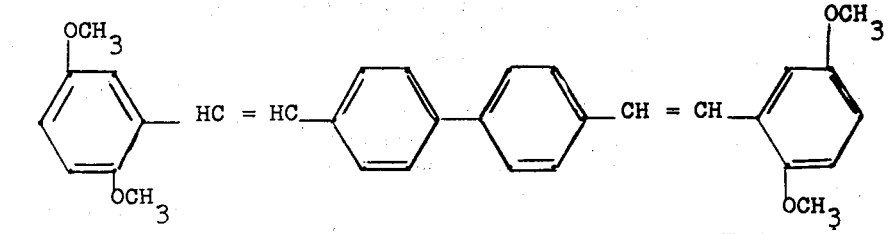

I claim:

1. Distyryl derivatives which correspond to the formula

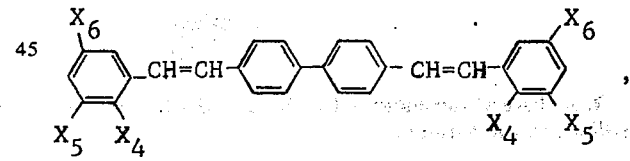

wherein $X_4$, $X_5$ and $X_6$ are the same or different and represent hydrogen, alkyl containing from 1 to 4 carbon atoms or alkoxy containing from 1 to 4 carbon atoms, also one of the symbols $X_5$ or $X_6$ represents an allyl or crotyl group or $X_4$ together with $X_5$ represent a methylenedioxy group, in which connection, however, at least one and up to two of the symbols $X_4$, $X_5$ and $X_6$ represent an alkoxy group containing from 1 to 4 carbon atoms or $X_4$ together with $X_5$ represent a methylenedioxy group.

2. Distyryl derivatives according to claim 1 which correspond to the formula

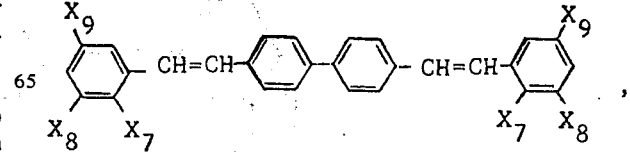

wherein one of the symbols $X_7$, $X_8$ and $X_9$ represents a methoxy group, a second represents hydrogen or methoxy and the third represents hydrogen or an alkyl group containing from 1 to 4 carbon atoms.

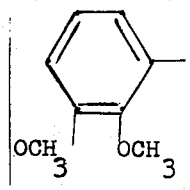

3. A distyryl derivative of claim 1 and which corresponds to the formula

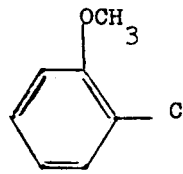

4. A distyryl derivative of claim 1 and which corresponds to the formula

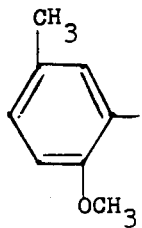

5. A distyryl derivative of claim 1 and which corresponds to the formula

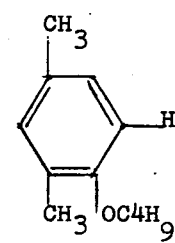

6. A distyryl derivative of claim 1 and which corresponds to the formula

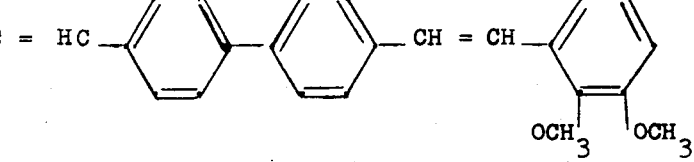

7. A distyryl derivative of claim 1 and which corresponds to the formula

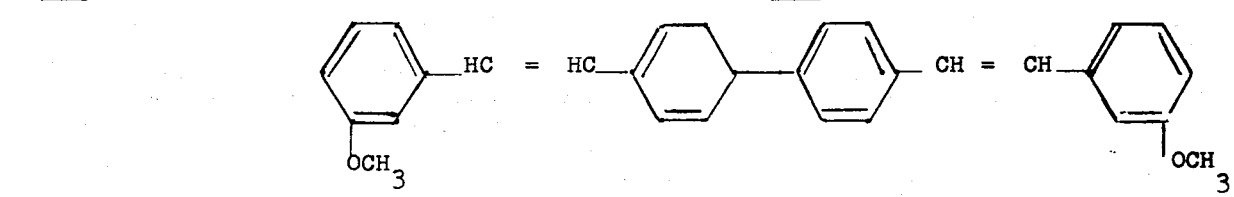

8. A distyryl derivative of claim 1 and which corresponds to the formula

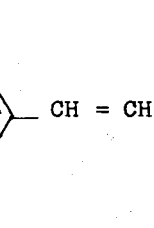

9. A distyryl derivative of claim 1 and which corresponds to the formula